US005297286A

United States Patent [19]

Uehara

[11] Patent Number: 5,297,286

[45] Date of Patent: Mar. 22, 1994

[54] POPUP CONTROL SYSTEM FOR PORTABLE COMPUTER HAVING SETUP FUNCTION AND POPUP FUNCTION

[75] Inventor: Keiichi Uehara, Tokyo, Japan

[73] Assignee: Kabushiki Kaisha Toshiba, Kawasaki, Japan

[21] Appl. No.: 783,911

[22] Filed: Oct. 29, 1991

[30] Foreign Application Priority Data

Nov. 7, 1990 [JP] Japan .................................. 2-301692

[51] Int. Cl.[5] ............................ G06F 3/14; G06F 9/44

[52] U.S. Cl. .................................... 395/700; 395/161; 395/155; 364/DIG. 2; 364/927.63; 364/927.2; 364/927.7; 364/975.2; 364/976; 364/948.2; 364/948.21; 364/927; 364/934

[58] Field of Search ............... 395/650, 700, 760, 575, 395/155, 156, 157, 159, 161, 800, 725, 550

[56] References Cited

U.S. PATENT DOCUMENTS

| | | | |
|---|---|---|---|
| 4,251,883 | 7/1981 | Grants et al. | 364/900 |
| 4,823,283 | 4/1989 | Diehm et al. | 395/156 |
| 4,939,507 | 7/1990 | Beard et al. | 364/200 |
| 5,179,700 | 1/1993 | Aihara et al. | 395/650 |
| 5,220,675 | 6/1993 | Padawer et al. | 395/800 |
| 5,228,122 | 7/1993 | Cahn et al. | 395/155 |
| 5,243,697 | 9/1993 | Hoeber et al. | 395/156 |

*Primary Examiner*—Kevin A. Kriess
*Attorney, Agent, or Firm*—Finnegan, Henderson, Farabow, Garrett & Dunner

[57] ABSTRACT

A selection menu screen for specifying if a popup function should be enabled or disabled is displayed in a setup process. The selected information in the setup process is stored in an RTC memory backed up by a battery. A CPU initiates a timer interrupt process in response to an interrupt signal from a programmable interrupt timer. At this time, the CPU refers to the RTC memory, and skips a routine for a popup process when the popup function is disabled and executes a routine for another timer interrupt process. The CPU performs the popup process only when the popup function is enabled.

5 Claims, 4 Drawing Sheets

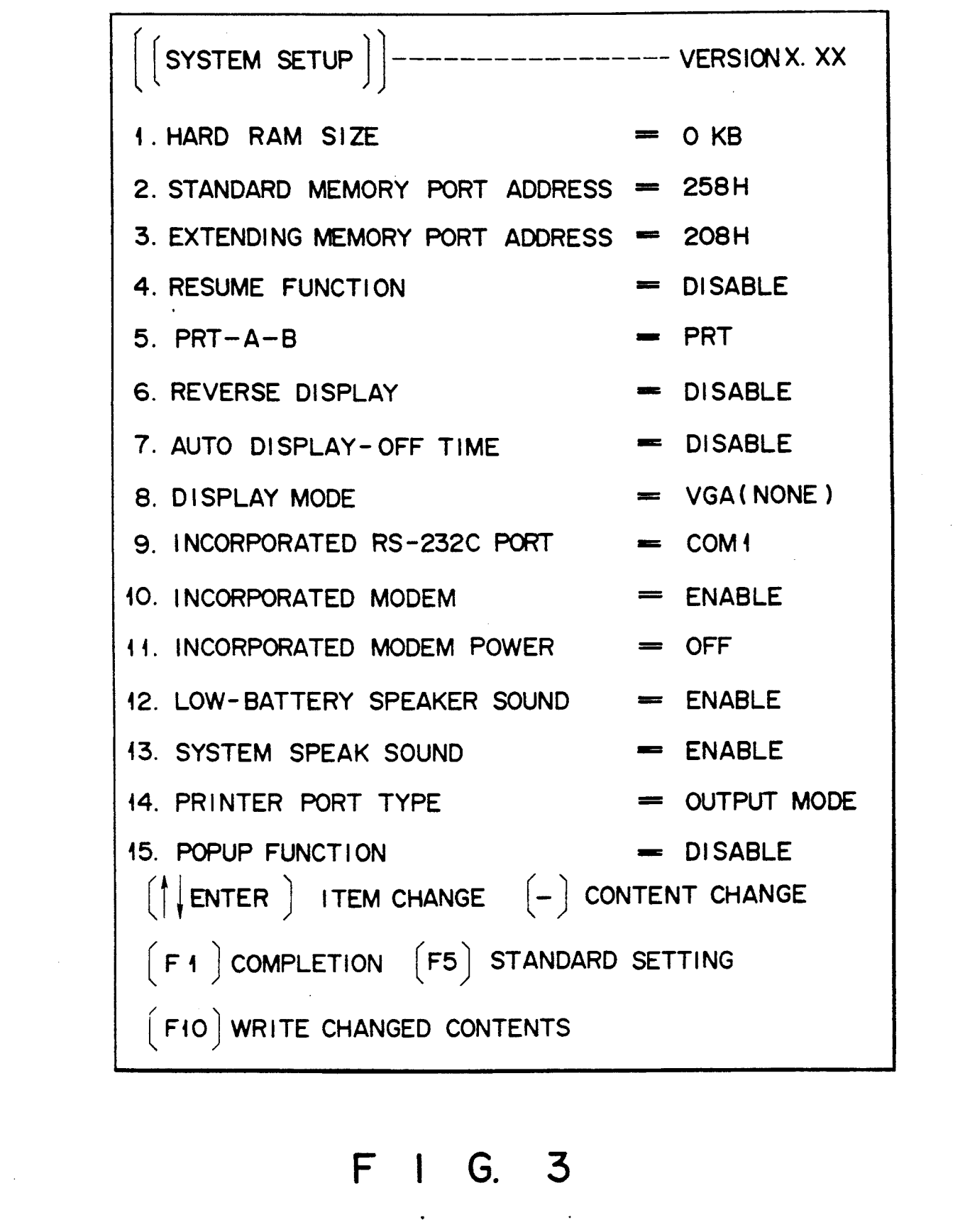

[[SYSTEM SETUP]] ------------------ VERSION X. XX

| | | |
|---|---|---|
| 1. HARD RAM SIZE | = | 0 KB |
| 2. STANDARD MEMORY PORT ADDRESS | = | 258H |
| 3. EXTENDING MEMORY PORT ADDRESS | = | 208H |
| 4. RESUME FUNCTION | = | DISABLE |
| 5. PRT-A-B | = | PRT |
| 6. REVERSE DISPLAY | = | DISABLE |
| 7. AUTO DISPLAY-OFF TIME | = | DISABLE |
| 8. DISPLAY MODE | = | VGA(NONE) |
| 9. INCORPORATED RS-232C PORT | = | COM1 |
| 10. INCORPORATED MODEM | = | ENABLE |
| 11. INCORPORATED MODEM POWER | = | OFF |
| 12. LOW-BATTERY SPEAKER SOUND | = | ENABLE |
| 13. SYSTEM SPEAK SOUND | = | ENABLE |
| 14. PRINTER PORT TYPE | = | OUTPUT MODE |
| 15. POPUP FUNCTION | = | DISABLE |

[↑↓ENTER] ITEM CHANGE [-] CONTENT CHANGE

[F1] COMPLETION [F5] STANDARD SETTING

[F10] WRITE CHANGED CONTENTS

FIG. 3

POPUP CONTROL SYSTEM FOR PORTABLE COMPUTER HAVING SETUP FUNCTION AND POPUP FUNCTION

BACKGROUND OF THE INVENTION

1. Field of the Invention

The present invention relates to a popup control system for a portable computer having a setup function and a popup function.

2. Description of the Related Art

Some portable computers have a setup function to alter the system configuration of the individual computer, and a popup function; the former function is generally initiated by a disk operating system. The popup function is to cut a part of the display screen to form a window on the disk operating system or during execution of an application program in response to a specific key input, and display the remaining power of a drive battery or an ON/OFF message for a resume function (which ensures the status of the system when powered off to be resumed when the system is activated again) on the window screen to permit the resume function to be enabled or disabled as needed. This popup function is generally initiated upon depression of a specific key (for example, a function key or an Escape key). Such a portable computer has a programmable interval timer which generates an internal interrupt (software interrupt) for every given time. In response to this internal interrupt, a CPU polls a keyboard controller to determine if any key is depressed. When a specific key instructing the activation of the popup function is depressed, the CPU initiates the routine for a popup process.

Portable computers having such a popup function therefore require longer time for the CPU to attend to the timer interrupt process as compared with computer having no popup functions. If the CPU is executing an application program such as a communication processing, with a high communication rate, the CPU may still be executing the timer interrupt process when it is the time to transmit the next bit. This is likely to cause a bit drop in communication data. This is because the timer interrupt process is performed irrespective of whether the popup function is necessary or not. When the popup function is not used, therefore, wasteful processing intervenes processing in the portable computer, thus lowering the processing speed of the system.

SUMMARY OF THE INVENTION

It is therefore an object of the present invention to provide a popup control system for a portable computer which has a selection function for selectively disabling a popup function to eliminate wasteful processing while realizing the popup function, thus always ensuring an efficient processing.

According to one aspect of the present invention, a popup control system for a portable computer having a setup function and a popup function to be initiated by a timer interrupt process to alter a system configuration comprises means for displaying on a setup menu screen a menu for selection of whether the popup function is to be enabled or disabled; selecting means for selecting whether the popup function is to be enabled or disabled in accordance with the displayed menu; and means for omitting a popup process during execution of the timer interrupt process when disabling the popup function is selected by the selecting means.

According to another aspect of the present invention, a popup control method for a portable computer having a setup function and a popup function to be initiated by a timer interrupt process to alter a system configuration comprises the computer steps of displaying on a setup menu screen a menu for selection of whether the popup function is to be enabled or disabled; selecting whether the popup function is to be enabled or disabled in accordance with the displayed menu; and omitting a popup process during execution of the timer interrupt process when disabling the popup function is selected in the selecting step.

According to the present invention, a menu for specifying whether the popup process should be enabled or disabled is displayed on a setup menu screen. The specified information about the enabling or disabling of the popup process is stored in an RTC (Real-Time Clock) memory backed up by a battery. In initiating the timer interrupt process, a CPU refers to the RTC memory to determine whether the popup process should be enabled or disabled. When the popup process is disabled, the CPU skips the routine for this process and executes another timer interrupt process. This feature permits the activation of the popup process only when specified by a user. It is therefore possible to eliminate wasteful processing while realizing the popup function, thus always ensuring an efficient processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a diagram exemplifying a setup menu screen for the portable computer shown in FIG. 2;

DETAILED DESCRIPTION OF THE PREFERRED EMBODIMENTS

Figure 1:
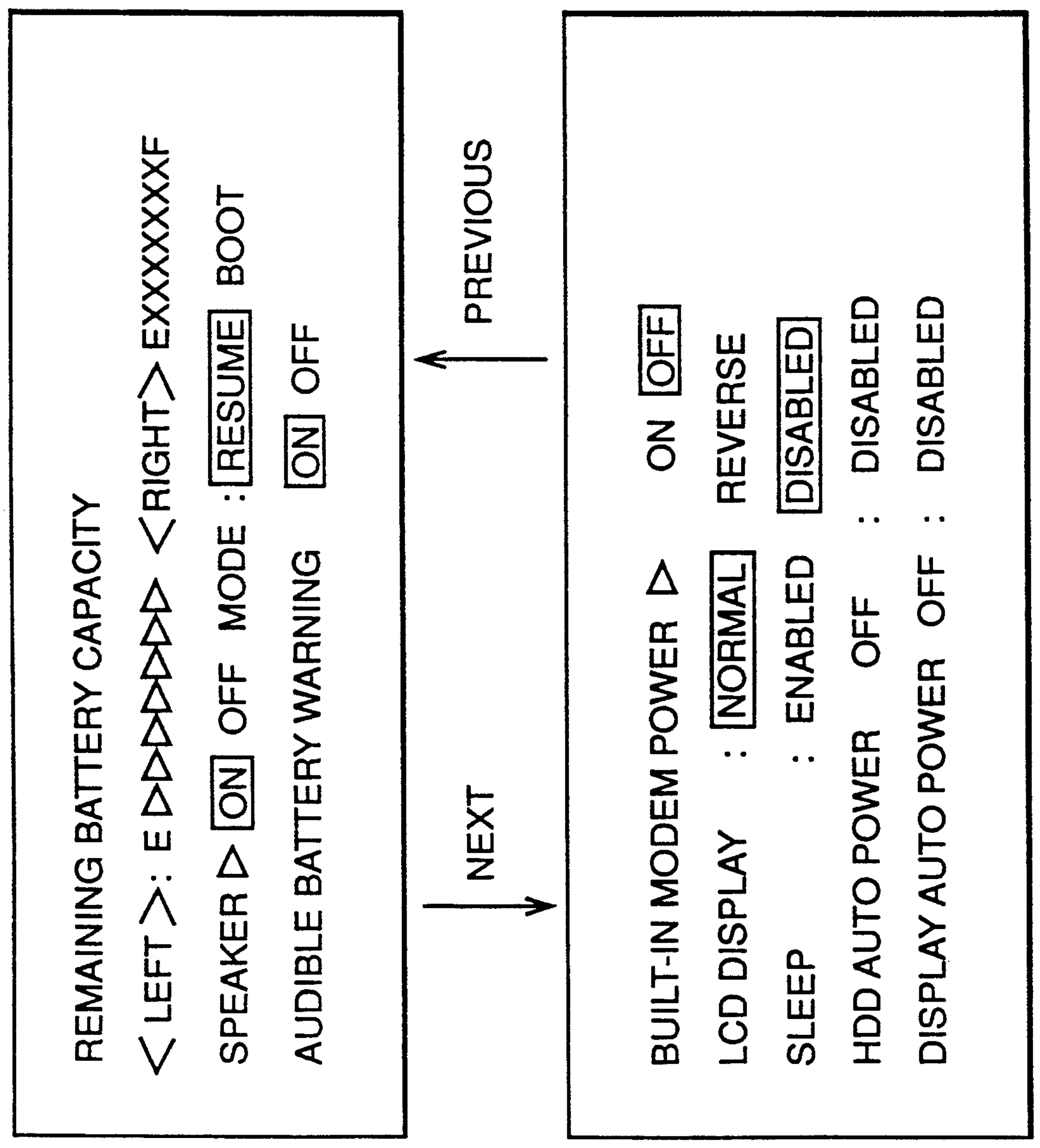
FIG. 1 (PRIOR ART)
FIG. 1 is a diagram exemplifying a general popup menu screen.
Figure 2:
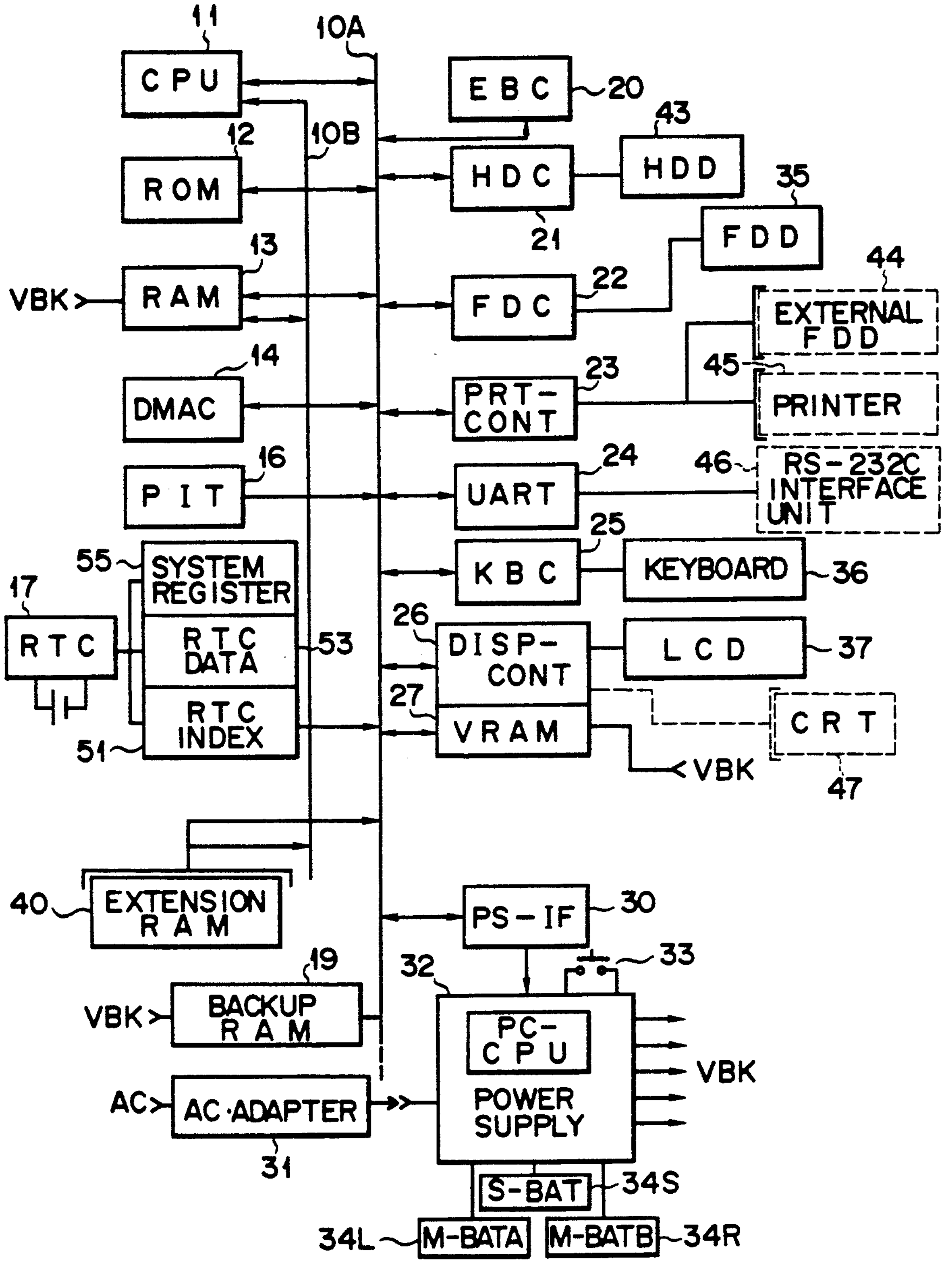
FIG. 2 is a block diagram illustrating one embodiment of a portable computer where a popup control system and method according to the present invention is applied.

In FIG. 2, reference numeral "10A" denotes a system bus and "10B" an internal bus. Reference numerals "11" to "30" denote components to be connected to the system bus 10A. A CPU (main CPU) 11 which performs the general control of the system accesses a BIOS-ROM 12 when the system is powered, and executes routines for a setup process and a timer interrupt process as shown in FIGS. 4 and 5.

Figure 4:
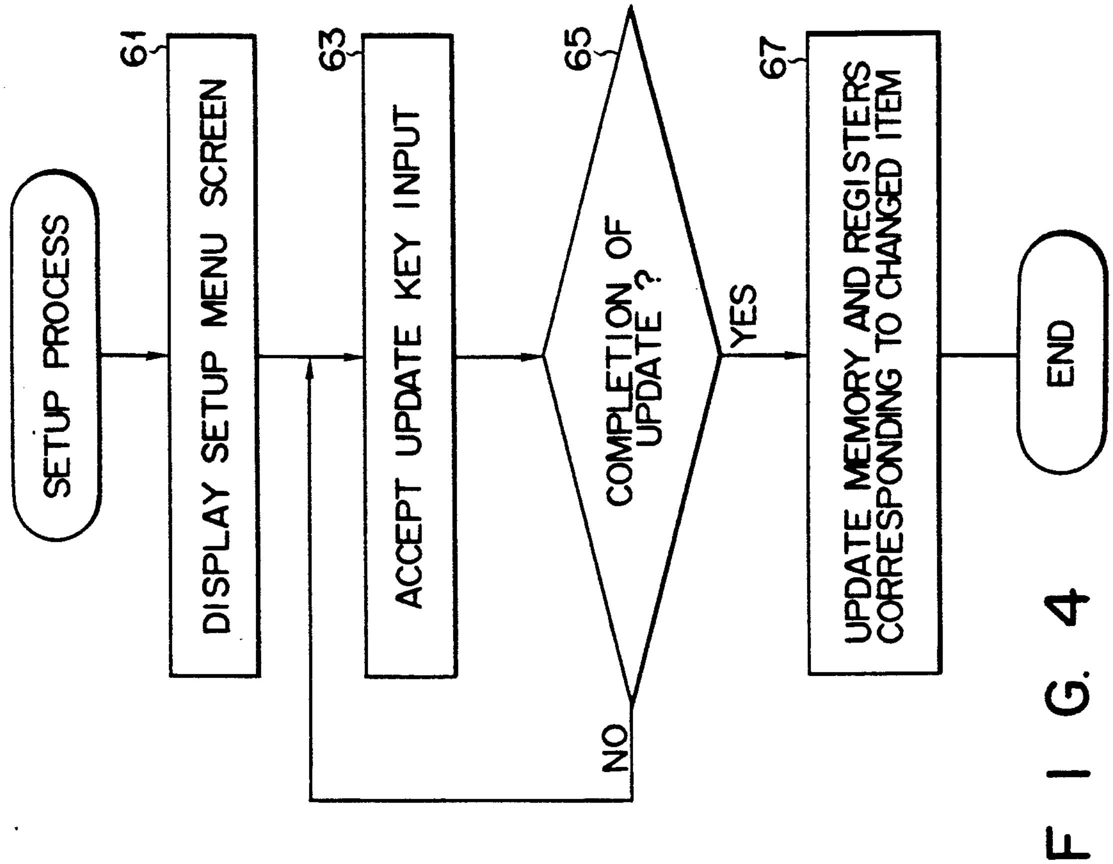
FIG. 4 is a flowchart showing a routine for a setup process which a CPU executes.
Figure 5:
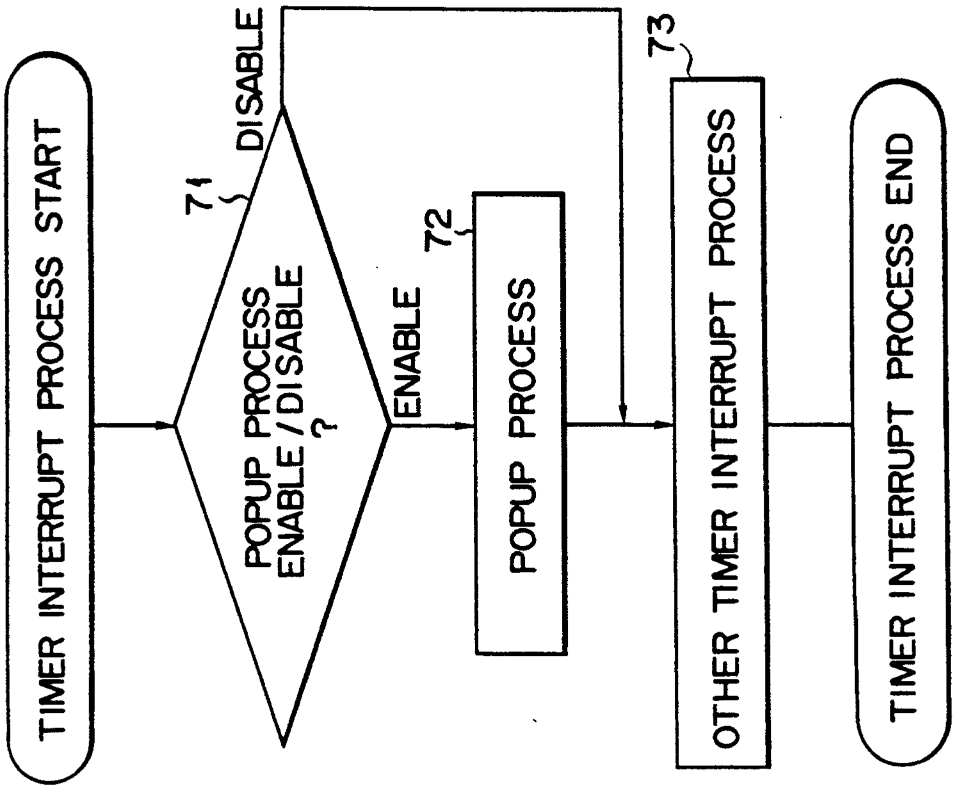
FIG. 5 is a flowchart showing a routine for a timer interrupt process executed by the CPU in the portable computer shown in FIG. 2.

The BIOS-ROM 12 stores a fixed program or the like which includes the routines of the setup process and the timer interrupt process shown in FIGS. 4 and 5.

A RAM 13 constitutes a main memory which stores a program or data to be processed. A DMA controller (DMAC; Direct Memory Access Controller) 14 performs a direct memory access control.

A programmable interval timer (PIT) 16 includes a programmable interrupt controller (PIC). A clock module (RTC; Real-Time Clock, hereafter referred to as "RTC memory") 17 has its own operation battery. The RTC memory 17 stores information of a date and time, and selective system control information, which specifies whether a popup function should be enabled or disabled, and is selected from a setup menu to be described later. A system register 55 is connected to the RTC memory 17. The system register 55 is a readable register which holds a value sent to an RTC index register 51 under the control of the CPU 11. The same I/O port address as that of the RTC index register 51 is assigned to the system register 55, so that it appears that the RTC index register 51 is readable from the view point of software.

A backup RAM 19 is a section which holds data to perform a resume function and where backup power (VBK) is supplied. Stored in the backup RAM 19 are tone levels and other parameters necessary for display control which are to be set in a pallel register in a display controller 26. The contents of the memory and registers when the power is turned off are also stored in the backup RAM 19.

An expansion bus connector (EBC) 20 serves to extend functions, and to this connector 20 are connected various extended option devices, such as an expansion memory board and a communication board, installed in an expansion unit 41 (not shown).

A hard disk controller (HDC) 21 serves as an interface to connect a hard disk pack (HDD) 43 to the system.

A floppy disk controller (FDC) 22 controls a single floppy disk drive (FDD) 35 in this case.

Reference numeral "23" denotes a printer controller (PRT-CONT) to which, for example, 5-inch external floppy disk drive 44 or a printer 45 is selectively connected via a connector. Reference numeral "24" is an I/O interface (UART; Universal Asynchronous Receiver/ Transmitter) where an RS-232C interface device 46 or the like is connected as needed. A keyboard controller (KBC) 25 controls an input from a keyboard 36 which is integrally provided on the computer body where a CPU board is mounted. A display controller (DISP-CONT) 26 controls, in this case, only an LCD 37 with a back light (or a side light), which is installed in a display case attached swingable to the computer body. However, the display controller 26 can also control a CRT display 47 as an external display. Reference numeral "27" is a video RAM (VRAM) where the backup power (VBK) is supplied, and "30" a power control interface (PS-IF) for connecting a power supply (intelligent power supply) 32 via the system bus 10A to the CPU 11. The PS-IF 30 has a serial-to-parallel conversion function to exchange data via a serial interface with a power control CPU (PC-CPU) in the power supply 32. A power adapter (hereafter referred to as "AC adapter") 31 rectifies and smooths commercially available AC power to provide DC power of a predetermined potential. The AC adapter 31 is plugged in the portable computer body. The power supply 32 has the power control CPU as described above, and a power switch 33 renders the power to the computer body on or off. Reference numerals "34L" and "34R" denote pack type rechargeable main batteries (M-BATA and M-BATB) detachable from the portable computer body. In this case, one of these batteries 34L and 34R is selectively used (as the power supply) under the control of the power supply 32 at the time of activation. When the power from one battery is discharged to the usable limit, the other battery is then replaced with the former battery. Reference numeral "34S" is an incorporated sub-battery (S-BAT) constituted of a rechargeable battery like the main batteries. The sub-battery 34S supplies the backup power (VBK) to memories requiring a power backup, such as the RAM 13, an extended RAM 40 and the video RAM 27.

The extended RAM 40 can be detachably placed into an exclusive card slot of the portable computer body. The aforementioned expansion unit 41 is selectively connected to the expansion bus connector (EBC) 20, with various extended option devices, such as an extended memory board and a communication board, being installed in the unit 41. An incorporated connector 42 (not shown) connects a hard disk pack to be installed in the computer body to an interface, when the system-up of the portable computer to a hard-disk (HDD) loading type (having one HDD and one FDD installed) is carried out. The hard disk pack 43 is thus connected to the interface via the connector 42.

FIG. 3 illustrates an example of a setup menu screen. If a setup command is entered through a key operation in a disk operating system, the CPU 11 displays a setup menu shown in FIG. 3 on the display device 37. The set up menu shows a selection menu for selecting whether the popup function should be enabled or disabled as well as setup items such as the hard RAM size, standard memory port address, extending memory port address, resume function, PRT-A-B, reverse display, auto display-off time, display mode, incorporated RS-232C port, incorporated modem, incorporated modem power, low-battery speaker sound, system speaker sound and printer port type. An operator uses arrow keys to position a cursor to any item which the operator wants to change, and depresses the "—" key to input a necessary character or numeral and update the contents of the item. When the "F1" key is depressed, no change will be made, and the system setup process will be terminated. When the "F5" key is depressed, default values are set for the items. With the "F10" key depressed, parameters set on the display are will be finally saved. The item relating to the present invention is the popup function. The operator will make an input to disable this item when the popup process is not necessary.

FIG. 4 is a flowchart showing the routine of the setup process that the CPU 11 executes. The CPU 11 displays the setup menu screen shown in FIG. 3 on the display device 37 in step 61. The CPU 11 then accepts an update key input in step 63. The operator moves the cursor to the desired item for updation using the arrow keys, and alters the contents of the item. When the CPU 11 judges in step 65 that the updating of the item is completed by depression of a specific key, such as a function key, the CPU 11 updates the parameters of the memory and registers corresponding to the changed item.

FIG. 5 shows the routine of the timer interrupt process. The CPU 11 executes the timer interrupt process in response to an interrupt signal from the programmable interrupt timer 16. In step 71, the CPU 11 determines whether the popup function set in the setup process is enabled or disabled, referring to the RTC memory 17 When the judgment is made that the popup function is disabled, the CPU 11 skips the popup process in step 72, and advances to another interrupt process in step 73. If judging in step 71 that the popup function is enabled, the CPU 11 executes, the popup process in step 72. Further, in step 73, the CPU 11 executes another timer interrupt process, such as determining whether or not some key input has been made by polling the keyboard controller, or judging whether the battery is in a low level by polling the power supply 32.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A portable computer system, comprising:

key input means for inputting data and commands;

a central processing unit for controlling the system;

memory means for storing a plurality of system configuration information and setup and popup utility programs, wherein the plurality of system configuration information includes a status of the popup utility program;

setup means for displaying the plurality of system configuration information on a display screen and selectively setting the plurality of system configuration information, the setup means being inactive while an application program is being executed;

timer interrupt means for periodically generating an interrupt signal to the central processing unit;

means for determining, in response to the interrupt signal, whether the status of the popup utility program is enabled or disabled;

popup means for displaying on the display screen, in response to the status of the popup utility program as being enabled and independent of the execution of the application program, a predetermined portion of the system configuration information and selectively setting the predetermined portion of the system configuration.

2. A portable computer system according to claim 1, wherein the memory means comprises an information memory storing the system configuration information indicating the status of the popup utility program, and a battery for providing a backup function for the information memory.

3. A portable computer system according to claim 1, wherein the predetermined portion of the system configuration information displayed by the popup means comprises at least one of a remaining power of a battery for driving the portable computer system, a status of an incorporated loudspeaker, a status of a resume function, a status of a function to inform of a low-battery status by a sound, a status of a power of an incorporated modem, a status of the display screen, a status of the central processing unit, a status of a function to automatically power off an incorporated hard disk drive, and a status of a function to automatically deactivate the display screen.

4. A portable computer system according to claim 1, wherein the predetermined portion of the system configuration information displayed by the popup means comprises a remaining power of a battery for driving the portable computer system, a status of an incorporated loudspeaker, a status of a resume function, a status of a function to inform of a low-battery status by a sound, a status of a power of an incorporated modem, a status of the display screen, a status of the central processing unit, a status of a function to automatically power off an incorporated hard disk drive, and a status of a function to automatically deactivate the display screen.

5. A popup control method for a portable computer having a setup function and a popup function to be initiated by a timer interrupt process to alter a system configuration, comprising the computer steps of:

displaying, by the portable computer, on a setup menu screen a menu for selection of whether the popup function is to be enabled or disabled;

selecting, by a user of the portable computer, whether the popup function is to be enabled or disabled in accordance with said displayed menu;

omitting, by the portable computer, a popup process during execution of said timer interrupt process when the popup function is selected as disabled in the selecting step.

* * * * *